No. 730,985. PATENTED JUNE 16, 1903.
P. SWAN.
ELECTRIC MOTOR FOR CEILING FANS.
APPLICATION FILED JAN. 13, 1903.
NO MODEL.
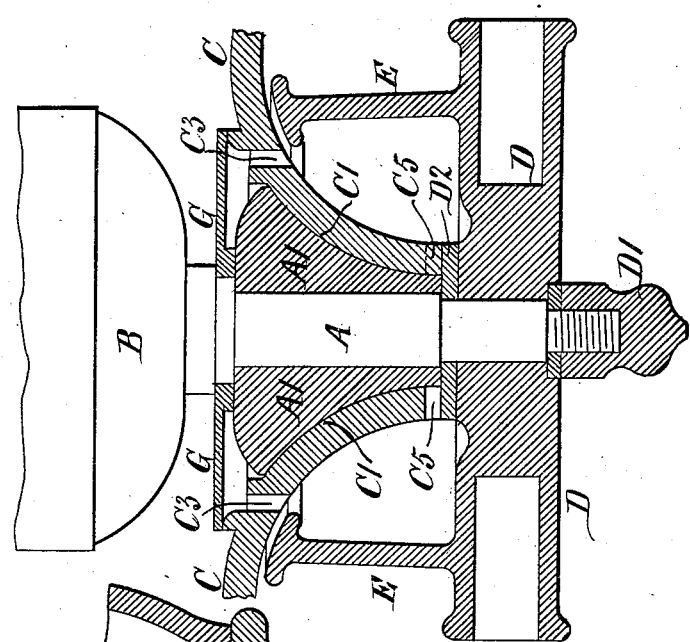
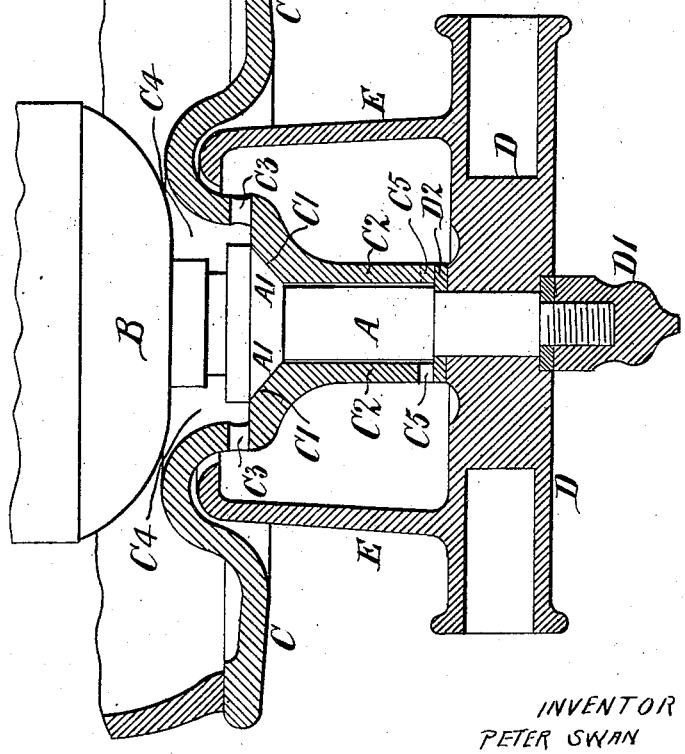
WITNESSES:
F. W. Wright.
E. W. Collins
INVENTOR
PETER SWAN
BY
Howson and Howson
HIS ATTORNEYS No. 730,985. Patented June 16, 1903.

UNITED STATES PATENT OFFICE.

PETER SWAN, OF CALCUTTA, INDIA.

ELECTRIC MOTOR FOR CEILING-FANS.

SPECIFICATION forming part of Letters Patent No. 730,985, dated June 16, 1903.

Application filed January 13, 1903. Serial No. 138,867. (No model.)

*To all whom it may concern:*

Be it known that I, PETER SWAN, a subject of the King of Great Britain and Ireland and Emperor of India, and a resident of Calcutta, India, (whose postal address is 52/3 Park street, Calcutta, India,) have invented certain new and useful Improvements in Electric Motors for Ceiling-Fans, (for which I have applied for British Patent, No. 16,072, dated July 19, 1902,) of which the following is a specification.

My said invention relates to electric motors for ceiling-fans, which motors have their armature-spindles revolving in a vertical axis; and it has for its object to improve the arrangement and construction of such spindles, so as thereby to render the motors more efficient and reliable. These electric motors have hitherto been generally made with an upper and a lower bearing, the upper bearing having an oil-cup attached to the armature-spindle revolving in the said bearings. It is found in practice, however, that this arrangement is defective, as oil constantly finds its way down the spindle from the upper bearing onto the commutator or onto the armature-coils, where it corrodes the insulation and causes short-circuiting. My invention is designed to overcome such defect; and it consists in dispensing with the upper bearing and oil-cup and employing only a lower bearing of improved construction, so that the armature will run true and neither vibrate nor tilt, while at the same time ample provision is made for the efficient and continuous lubrication of the said bearing.

The invention is represented in the accompanying drawings, in which the same reference letters are used to mark the same or like parts wherever they are repeated.

Figures 1 and 2 of the drawings are vertical sections of the lower portions of the electric motors and showing the improved lower bearing as applied to motors of the drum-armature type.

As shown in Fig. 1 the improved bearing for the vertically-mounted spindle A of the armature B is formed on the lower cover C of the motor; but instead of the bearing being made flat, as usual, a conical bearing-surface $C'$ is provided, the usual washer-pieces or bearing parts $A'$ on the spindle being shaped to fit the said bearing. In some cases the bearing may be made cup-shaped instead of conical. The spindle extends down through the projecting guide portion $C^2$ of the cover C and has the usual holder D for the fan-blades secured to a reduced part $A^2$ on its lower end by means of a nut $D'$, an adjusting washer-piece $D^2$ being preferably interposed between the holder and the guide portion. Lateral openings $C^3$ are formed in a recessed part $C^4$, formed on the cover immediately above the bearing, similar openings $C^5$ being also formed in the lower end of the guide portion $C^2$ of the cover. A drum-shaped oil receptacle or cup E is formed on the upper side of the fan-holder D, being made narrower at the top than at the bottom, and when the motor is working the oil placed in the cup passes to the spindle A through the inlets $C^5$ and then travels up the spindle to the bearing, the shape of the bearing causing it to act as a pump, so that the bearing is thoroughly lubricated, the surplus oil escaping thereafter to the oil-cup through the outlets $C^3$ above the bearing. The oil-cup E instead of being formed to rotate with the fan-holder D may be arranged as a separate fixed piece. With the hereinbefore-described arrangement and construction of bearing the defect alluded to connected with the present methods of carrying the armature-spindle is overcome, as the oil for lubrication cannot reach the commutator or armature parts to affect them. With this improved arrangement also the spindle A becomes self-centering in action, while the shape of the bearing causes it to rotate with perfect steadiness, so that the armature runs true without tendency to vibrate or tilt.

In the example shown in Fig. 2 the shape of the bearing is slightly modified, its surface being of convex form and extending down to the lower end of the cover C, so that this bearing is considerably deeper than that shown in Fig. 1. The curve forming the convex $C'$ is preferably formed after the style of what is known as Schiele's antifriction-curve. The bearing-piece $A'$ on the spindle A is preferably made of hard white metal, such as Babbitt, and is fixed to the spindle in any convenient way, a concave surface being formed on the bearing-piece $A'$, so as to fit the aforesaid convex bearing C' on the cover C. The gradually-increasing diameter of the bearing-piece A' from bottom to top causes it to act as a centrifugal pump, so that when the spindle is rotating oil is sucked out of the oil-cup E through the inlets $C^5$ into the bearing, so as to thoroughly lubricate it, the surplus oil which escapes at the top end of the bearing returning to the oil-cup through the outlets $C^3$. A vulcanized cover G is provided over the top of the bearing, so as to prevent the oil from dashing up to affect the armature. This construction of bearing thus gives an exceptionally steady and smooth running spindle and armature.

In the claims I use the term "conoidal" in a sense to include either the true cone of Fig. 1 or the curved surface of Fig. 2, the object being to so shape this bearing part as to cause the oil to creep up between the surfaces upon the revolution of the conoidal bearing.

I claim as my invention—

1. In electric motors for ceiling-fans having drum-armatures on a spindle revolving about a vertical axis, a fixed conoidal bearing on a part through which the spindle passes freely, a conoidal bearing part on the armature-spindle to fit the fixed bearing, there being an oil-receiver encircling the bearing, and oil-ducts communicating with the bearing parts and the oil-cup so that the conoidal bearing parts may act as a pump to circulate the oil, substantially as described.

2. In electric motors for ceiling-fans having drum-armatures revolving about a vertical axis, a lower cover fitted below the armature, a conoidal bearing formed in the cover, a vertical spindle fitted to the armature and passing down freely through the cover, conoidal bearing parts on the spindle to fit the bearing in the cover, a holder for the fan-blades fixed to the lower end of the spindle, an oil-receiver formed on the holder, there being oil-ducts in the central part of the cover to communicate with the bearing parts and the oil-receiver so that the conoidal bearing-surfaces can act as a pump to circulate the oil, substantially as set forth.

In testimony whereof I have signed my name to this specification in the presence of two subscribing witnesses.

PETER SWAN.

Witnesses:
IAGESH CHANDER BORE,
JATISH CHANDER DASS.